3,577,521
STORAGE-STABLE FROTHING TOOTHPASTE
Karlheinz Scheller, Eislingen (Fils), Else Koddermann, Ebersbach (Fils), and Hans Trebs, Eislingen (Fils), Germany, assignors to Firma Dr. Scheller Duro Dont, Eislingen (Fils), Germany
No Drawing. Filed July 14, 1967, Ser. No. 653,315
Claims priority, application Germany, July 29, 1966, D 50,712
Int. Cl. A61k 7/16
U.S. Cl. 424—55   4 Claims

ABSTRACT OF THE DISCLOSURE

A storage-stable toothpaste that froths in use; comprising a colloidal silica thickened alcohol system that contains a limited amount of water, peroxide as a gas producing agent and an acid salt as an acidifying agent. When mixed with water and/or saliva the peroxide reacts causing the paste to foam and the pH of the mixture shifts from acidic to basic within a few minutes.

---

This invention relates to a storage-stable frothing toothpaste, more particularly to a novel storage-stable, alcohol-containing toothpaste having a content of active ingredients which are valuable from the dental-medicinal point of view. This mixture of active ingredients is not stable in conventional aqueous recipes but rather undergoes decomposition with evolution of gas and inflation of the tubes or leads to deactivation of the toothpaste composition by chemical reaction. This mixture of active ingredients comprises primarily percompounds furnishing active oxygen and/or carbonates or bicarbonates which are used together with compounds which have an acid reaction and are present in an amount such that the paste has latent acidity.

Cleansing agents and disinfectants based on peroxides and persalts and containing active oxygen are known. In general, these agents could be prepared only in powder form and not in paste form because the percompounds, as is known, undergo decomposition when contacted with water with evolution of oxygen, which results in destruction of the tubes, especially in storage. Attempts have been made, however, to prepare tooth pastes which have a content of persalts or peroxides. Thus, the use of an alcohol-soap gel of the type of modern perfume sticks has been proposed for the preparation of toothpaste containing percompounds. According to another proposal, percompounds which are free from water of crystallization are incorporated in a water-free paste formulated on the basis of polyether glycol. These proposals do not meet with the great number of technical and esthetical requirements of a storage-stable toothpaste.

According to another proposal which has been made, a powder containing a peroxide or persalts and intended for use in the preparation of mouth lotions is stabilized by addition of acids or acid salts. It is not understood how stabilization occurs in this case since, as is known, rapid decomposition of percompounds, e.g. peroxides, with evolution of free oxygen is initiated exactly in acidic aqueos media. A corresponding tendency of the toothpaste composition to decomposition must be expected if a carbon dioxide-forming component, e.g. an alkaline earth carbonate, is mixed with an acidic component for increased froth formation. Here again, rapid decomposition will generally occur so that the preparation of storage-stable products in this manner appears to be impossible.

Finally, a more recent proposal deals with the preparation of storage-stable alcohol-containing toothpastes. As is known, the readily volatile lower alcohols, especially ethanol, which are used in the cosmetic field are so highly volatile in storage that losses of alcohol and consequently incrustation of the tube contents cannot be avoided with conventional systems. According to the proposal just mentioned, a chalk-free, frothing, alcohol-containing toothpaste which is stable in storage in the form of paste is obtained by using colloidal silica as thickener. The silica is used for this purpose in two different particle sizes, the smaller particles having a size of about 4 to 20 millimicrons and the coarser particles having preferably a size of 35 to 40 microns. The ratio of the finer particles to the coarser particles may be in the range of about 2:1 to 3:1. Such a paste does not differ in external appearance from commercially available white pastes containing conventional thickener systems.

It is an object of the present invention to provide a toothpaste which contains the percompounds which are desirable from the dental-medicinal point of view and/or $CO_2$-yielding components. It is another object of the invention to provide a toothpaste which in use initiates in a rapid decomposition reaction of these components the frothing of the composition by active oxygen and/or $CO_2$ and develops the specific activity of these components, this decomposition reaction being accelerated to such an extent that at least the predominant part of the active components has reacted during the short period of usual tooth brushing. It is clear that the decomposition which, if any, takes place at normal temperature in the neutral or alkaline region is insufficient to this end. Accordingly, it is an object of the invention to provide a toothpaste composition which has incorporated acidity therein and which contains the active components described above.

Apart from the apparent impossibility to incorporate acidity in acid-decomposable carbonates in paste form and yet obtain a storage-stable product, the achievement of this object was faced with further great difficulties. When attempting to incorporate acidity in alcohol-containing pastes based on a gel mixed with colloidal silica by adding organic or inorganic acids it was found surprisingly that such silica-alcohol gels are not stable to the addition of acids. Even the addition of amounts of as low as 0.01% by weight of an inorganic or organic acid may result in breakdown of the paste with formation of a fluid slurry which can no longer be thickened to the consistency of a paste. As a rule, this phenomenon is observed if the amount of acid added exceeds the limiting value of about 0.03% by weight. However, it is just an object of the invention to provide alcohol-containing toothpastes for which colloida silica is desirable as gelling agent. The phenomena described above and occurring upon addition of acid and the consequent minor shifting of the pH value into the acidic region seemed to be a fundamental obstacle to the achievement of the object of the invention.

However, it has further been found surprisingly that alcohol-silica gels while being completely instable to traces of acids exhibit outstanding stability to acid salts of organic and/or inorganic acids. It is possible to incorporate large amounts of such acid salts in the gel without-deterioration of the gel condition being to be feared immediately or as a long-range effect. Advantage is taken of this fact by the invention to provide a toothpaste which has incorporated acidity, i.e. to provide a paste which in use together with the saliva and the water introduced with the tooth brush into the cavity of the mouth gives initially an acid pH.

Certainly, advantage is further taken by the invention of the surprising fact that it becomes possible when restricting the water content of the paste composition to specific limiting values to combine percompounds and/or acid-decomposable carbonates with acid salts of inorganic and/or organic acids in the paste composition without decomposition of the acid-labile components taking place under the influence of the acid salts. Even though it has been known per se that alcohol has some stabilizing action on percompounds, it is highly surprising that percompounds and/or carbonates can be directly combined with acid salts in such an alcoholic medium without the feared decomposition reactions taking place in normal storage even over extended periods of time or even under aggravated storage conditions. This is especially true when considering that, as a rule, certain amounts of water cannot be excluded from the toothpaste composition were it only for economic reasons because it is necessary for the preparation of an inexpensive toothpaste to use commercial starting materials (ethanol, glycerol, etc.) which generally have a certain water content.

Accordingly, the invention is directed to a frothing, storage-stable toothpaste based on an alcohol-containing gel thickened to paste consistency, the paste being characterized in that, while having a water content of not more than about 10% by weight (based on the weight of the paste), it contains a mixture of physiologically acceptable peroxide compounds or persalts and/or carbonates or bicarbonates with physiologically acceptable acid salts of inorganic and/or organic acids which are present in an amount sufficient that the paste in use shows a weakly acid initial pH and that colloidal silica is present as a thickener known per se.

Preferred acid salts for incorporating acidity in the toothpaste include those of edible acids on the one hand, and those of acids of phosphorus, on the other hand. The term "phosphorus acids" comprises orthophosphoric acid and anhydrophosphoric acids. Particular importance for the purposes of the invention is to be attributed to the following organic acids: the known polybasic edible acids such as malic acid, citric acid, tartaric acid and/or lactic acid. Among the inorganic salts, acid pyrophosphates play a particular part. The selection of just these compounds is explained by the fact that a multiple importance is to be attributed to the acid salts within the overall combination. First of all, they have the function mentioned above to ensure rapid release of oxygen and/or evolution of $CO_2$ by generation of an acid pH. Without the incorporation of acidity, the pastes would have a weak alkaline reaction. In this case, an excessively long period of time would be needed to evolve a sufficient amount of oxygen. The desirable evolution of $CO_2$ having the function of enhancing the cosmetically desirable froth formation of the active detergent conventionally present in toothpastes would not be initiated at all. However, of importance are not only these effects which are due to the acid function. The compounds which are preferably used for the purposes of the invention show additionally essential inherent effects in dental care. Thus, it is known that disodium pyrophosphate is active as complexing agent for calcium ions and is said to have tartar-detaching properties. Accordingly, the use of this pyrophosphate is preferred. It is further known that organic acids, preferably malic acid, has a dissolving action on tough tartar and an inhibitory action on the formation of tartar. It has been found that these properties cannot only be attributed to the free acids but also to the acid salts of the acids used in accordance with the invention. In particular, the alkaline earth metal salts and, above all the calcium and magnesium salts are important in this respect. For example, in case of malic acid, the latter show an inherent pH of about 3.4. Disodium pyrophosphate, in the concentration used and when contacted with water, has an inherent pH of 4.0 which, in mixture with the other ingredients of the paste, passes over to the desired initial pH of the paste of 6.0.

The precompounds used for the purposes of the invention are those known compounds which have already been proposed for comparable purposes. These are above all the solid, sparingly soluble peroxides of the alkaline earth metals. Particularly advantageous in this respect is magnesium peroxide which is mild to the body and mucous membrane. It is marketed in mixture with magnesia in a maximum concentration of 25%, at most 30%, of peroxide (content of active oxygen, 4.2 to 7.1%). Further suitable peroxides which are sparingly soluble in water are barium peroxide $BaO_2 \cdot 8H_2O$ (85 to 90%, content of active oxygen 8 to 8.5%); calcium peroxide $CaO_2 \cdot 8H_2O$ (60 to 80%, content of active oxygen, 13.5 to 18%), and strontium peroxide $SrO_2 \cdot 8H_2O$.

However, soluble peroxo compounds may also be used, particularly suitable being carbamide peroxide and sodium perborate. It has been found that the sparingly soluble peroxides tolerate a higher water content in the paste than the soluble types. While the water contents of the paste may be as high as about 10% by weight when using the insoluble alkaline earth metal peroxides, lower water contents are preferred with the soluble percompounds to achieve adequate stabilities. A limiting value in this respect is, for example 6% by weight, but it may be desirable to adjust the water content to somewhat lower values than 6%. Another suitable percompound is, for example, sodium pyrophosphate-peroxohydrate

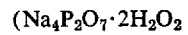

$$(Na_4P_2O_7 \cdot 2H_2O_2$$

content of active oxygen, about 8.7%).

The carbonates which are present in addition to, or in place of, the percompounds do not serve as cleansing material in the pastes of the invention as being known, for example, for the conventional chalk pastes, but for the evolution of $CO_2$ during brushing.

Particularly suitable in this respect are alkaline earth metal carbonates, especially magnesium carbonate.

The relative proportions of basic and acid components in the toothpaste of the invention are preferably balanced to one another in a specific manner. The basic components which are primarily used are the peroxides, e.g. the alkaline earth metal peroxides. In accordance with the invention, the amounts of these particular compounds are desirably balanced in such a manner that, when the paste is used, the initially weakly acid pH migrates rapidly, i.e. within a few minutes, into the neutral to alkaline region. This phenomenon and consequently the proper composition of the paste can be monitored in a very simple manner in a laboratory experiment. The paste is mixed with water in a ratio of 1:10 (1 g. of paste+about 4 g. of saliva, the balance being mouth washing water) and the variation of the pH during the course of the reaction is followed. For example, a paste which contains disodium pyrophosphate in addition to magnesium peroxide shows an acid initial pH in the range of 5.9 to 6.2 even over extended periods in storage. If water is added in a ratio of 1:10, vigorous evolution of oxygen takes place. Within the first two minutes, the pH rises slowly to 7.2. The curve then flattens and, after 8 minutes, reaches its alkaline terminal value at pH 8.4. Corresponding results are obtained if at least part of the disodium pyrophosphate is replaced by the acid calcium salt of malic acid (calcium malate). Even when stored for extended periods of time at 40° C. (at least 6 weeks), substantially no reaction takes place in the pastes, i.e. in the simulated use test, the pH variation in dependence upon the reaction time is unchanged. Corresponding results are obtainable when using other analogous reactant couples within the teaching according to the invention.

Based on the weight of the paste, the physiologically acceptable acid salts can be said to be desirably present in amounts of from 2.5 to 10% by weight, preferably in amounts of from about 3 to 6% by weight. As a rule, the basic percompounds are present in amounts of a few percent by weight, e.g., up to 5% by weight (based in each case on the weight of the paste). If $CO_2$ evolution in use is desired and, accordingly, carbonates are present in the finished paste, the amount of the latter is not critical. If excess carbonate is present, $CO_2$ evolution will take place in the initial phases of the tooth brushing process, i.e. as long as the pH is still in a sufficiently acid region. Once it has moved into the neutral or even alkaline range, then no further evolution of CO₂ will occur. Of course, an excess still present of alkaline earth metal carbonate is not interfering. As a rule, an amount of a few percent by weight, based on the weight of the paste, e.g. an amount up to 5% by weight, is sufficient.

The liquid phase of the toothpaste of the invention contains a cosmetic alcohol, i.e. generally ethanol and/or propanol. If propanol is also used, n-propanol is preferred because of the taste or flavor. On principle, isopropanol may also be used additionally. However, it exerts a detrimental influence on taste and flavor so that at best small amounts, e.g. up to about 5%, are used. The total amount of alcohol present is preferably about 20 to 50% by weight of the total paste. It is not desirable to exceed the upper limit of about 50% by weight. This would not only make the paste considerably more expensive, but irritation of the mucous membrane of the mouth by an excessively high concentration of alcohol could not be excluded because sufficient dilution of the paste by saliva or mouth washing water is no longer ensured. Instead, a certain amount of glycerol and/or propylene glycol is also used in accordance with the invention as an additional liquid phase for paste formation. These components may be used in amounts of about 15 to 40% of the total paste. Lower amounts, e.g. in the range of about 20%, may be preferred. Glycerol is preferred of the two compounds mentioned above. 1,2-propylene glycol affects not only the taste and flavor detrimentally but reduces also the tendency desired to froth formation.

It is an essential advantage of the invention that these liquids must not be used in absolutely anhydrous form but may be employed in conventional degrees of purity with a low content of water. Thus, as a rule, the ethyl alcohol used is the commercial product containing 94.6% by weight of ethanol, the balance being water, while commercial grade glycerol, as is known, has a concentration of 86%, the balance being water. Of course, when adjusting the proper balance of paste components, care must be taken that the total water content does not exceed the limits mentioned above. In special cases, the water content may be reduced in a simple manner by using at least part of the liquid phases in anhydrous or largely dehydrated state.

Regarding the colloidal silicas acting as thickeners, reference is made to the disclosure of German Pat. 974,958. Accordingly, it may be particularly desirable for the purposes of the invention to use two different particle sizes of the colloidal silica. This ensures, on the one hand, reliable stabilization and fixation of the readily volatile constituents of the paste and, on the other hand, eliminates the glassy appearance of the paste which is readily obtained if colloidal silica of a very small particle size is exclusively used. The smaller particles may have a size in the order of 4 to 20 millimicrons while the larger particles may differ herefrom by orders of magnitude and, for example, may range between 35 and 40 microns. The smaller particles are generally used in an amount which is a multiple of the amount of the coarser colloidal silica. A total of only a few percent by weight of the mixture of colloidal silicas is necessary to achieve sufficient thickening of the paste. The amount of the colloidal silica may, for example, constitute about 3 to 5% by weight of the paste.

In other respects, the toothpaste of the invention contains the conventional constituents of commercial products. Thus, it may contain a cleansing material which is preferably selected from those having medium abrasion and which are just sufficient to remove from the teeth the film which is newly formed from day to day. Typical examples hereof include dicalcium phosphate dihydrate or anhydrous dicalcium phosphate. Furthermore, detergents and/or specific ingredients which are useful with respect to dental cosmetics such as fluorine compounds may be present. Conventional flavor substances may also be used. It has been found that full efficiency of the aroma oils is retained over an extended period of time by the stabilization of the peroxides in accordance with the invention. It is known from literature that changes of taste and flavor which are due to oxidation of the unsaturated flavor substances, particularly of peppermint oil, are the first to occur in dentifrices having an insufficiently stabilized peroxide content. These detrimental phenomena are eliminated in the products of the invention.

In a special embodiment of the invention, the preparation of the tooth-paste is combined with the preparation of the acid salts used as a component of the paste. This embodiment is of particular importance for compositions which contain acid salts of edible acids as a component incorporating acidity in the paste. As an example hereof, the preparation of acid calcium malate and its incorporation in the paste are described hereafter. However, this mode of operation is of more extensive importance and generally applicable to acid salts of polybasic organic acids.

The organic acid is dissolved in not more than two to three times its weight of alcohol (e.g. ethanol) and then reacted in a large excess, e.g. ten to twenty times the amount, of glycerol (e.g. doubly distilled commercial glycerol) with a slight excess of the cation-furnishing component, if necessary with gentle and careful heating. The cation-yielding compound is preferably used in an amount sufficient that the stoichiometrical reaction to form the acid salt will occur. For example, for preparing the acid calcium salt of malic acid, the method described below is typical of the course of the reaction.

In a reaction vessel, an ethyl alcohol solution of malic acid (0.3 to 3% of malic acid, based on the finished paste; absolute alcohol in an amount of twice to thrice the weight of malic acid) is reacted with a slight excess of precipitated calcium carbonate in ten to twenty times the amount of doubly distilled commerical glycerol while gently heating to 50° C. The reaction proceeds with evolution of CO₂ to form the acid calcium salt of malic acid which crystallizes with 6 water of crystallization. A water of crystallization is formed in the conversion process and 5 water of crystallization are withdrawn from the glycerol (constant mixture of 86% of glycerol and 14% of water/DAB 6). The newly formed compound is white and crystalline and has pH 3.4 in an aqueous solution. The reaction is believed to proceed as follows:

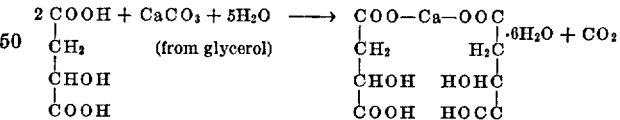

Restriction to two times to not more than three times the amount by weight of ethanol is important. If a higher alcohol concentration is used with the glycerol no reaction will surprisingly occur with the carbonates present. Thus, ethanol obviously acts as a stabilizer in the malic acid-carbonate system. This must be considered because traces of unreacted malic acid prevent, as described above, the gel formation upon addition of the colloidal silica so that the system remains fluid.

The suspension of the formed acid calcium salt of malic acid is then transferred into a normal drum for the preparation of tooth-pastes. It is then made up with absolute alcohol in an amount at least sufficient to reduce the water content of the overall paste to the level desired. Predried colloidal silica is then added to this liquid-salt suspension while constantly stirring to form the gel. After standing for a short period of time, the percompounds and, if desired, additional amounts of acid salts and the conventional paste ingredients such as cleansing material, aroma and flavor oil, sweetening agent, fluorine compounds, etc., may be incorporated.

Examples of tooth-paste compositions according to the invention are shown in the following table.

| | Examples | | | | | | | |
|---|---|---|---|---|---|---|---|---|
| | 1 | 2 | 3 | 4 | 5 | 6 | 7 | 8 |
| Ethyl alcohol, absolute | | | | | 40.0 | | | 40.0 |
| Ethyl alcohol, 94.6% | | 31.0 | 31.0 | 31.0 | | 31.0 | 31.0 | |
| n-Propanol | 40.0 | | | | | | | |
| Glycerol, 86.0% | 18.0 | 30.0 | 30.0 | 30.0 | 17.85 | 31.05 | 27.0 | 17.7 |
| Dicalcium phosphate·2H₂O | | 15.0 | 17.0 | 15.0 | | 17.5 | 18.0 | |
| Dicalcium phosphate, anhydrous | 20.0 | 2.8 | 4.8 | 2.45–1.35 | 20.0 | | 2.7–1.6 | 20.0 |
| Madrell salt | 2.8 | | | | 5.7 | | | 3.0–1.9 |
| Na hexametaphosphate | 1.0 | 1.0 | 2.0 | 1.0 | 1.0 | | 1.0 | 1.0 |
| Disodium pyrophosphate | 3.0 | 3.0 | 2.0 | 6.0 | 3.0 | 6.0 | 3.0 | 3.0 |
| Titanium dioxide | 1.0 | 1.0 | 1.0 | 1.0 | 1.0 | 1.0 | 1.0 | 1.0 |
| Colloidal silica (4–20 mµ, extra dry) | 3.0 | | | | 3.0 | | | 3.0 |
| Colloidal silica (35–40 µ, extra dry) | 1.0 | | | | 1.0 | | | 1.0 |
| Colloidal silica (4–20 mµ) (commercial grade) | | 3.0 | 3.0 | 3.0 | | 3.0 | 3.0 | |
| Colloidal silica (35–40 µ) (commercial grade) | | 1.0 | 1.0 | 1.0 | | 1.0 | 1.0 | |
| Sodium lauryl sulfate | 2.5 | 2.5 | 2.5 | 2.8 | 2.75 | 2.8 | 2.5 | 2.5 |
| Oleic acid methyl taurine-Na | 0.5 | 0.5 | 0.5 | 0.7 | 0.75 | 0.7 | 0.5 | 0.5 |
| Carbamide peroxide | 2.0 | | | | 2.0 | | | 2.0 |
| Magnesium peroxide (25%) | | 4.0 | | 4.0 | | 4.0 | 4.0 | |
| L-malic acid salt (calculated as free acid) | 1.0 | 1.0 | 1.0 | | | | 1.0 | 1.0 |
| Calcium carbonate, praec | | 2.25 | 2.25 | | | | 2.25 | 2.25 |
| Magnesium carbonate | 2.25 | | | | | | | |
| F compound | | | | 0.1–1.2 | | | 0.1–1.2 | 0.1–1.2 |
| Aroma and flavor oils | 1.8 | 1.8 | 1.8 | 1.8 | 1.8 | 1.8 | 1.8 | 1.8 |
| Sweetening agent | 0.15 | 0.15 | 0.15 | 0.15 | 0.15 | 0.15 | 0.15 | 0.15 |

EXAMPLE 9

| | G. |
|---|---|
| Ethyl alcohol, 96.4% | 35.0 |
| Glycerol, 86.0% | 24.0 |
| Dicalcium phosphate·2H₂O | 15.0 |
| Dicalcium phosphate, anhydrous | 5.0 |
| Titanium dioxide | 1.0 |
| Colloidal silica (4–20 mµ, commerical grade) | 3.3 |
| Colloidal silica (35–40µ, commercial grade) | 1.2 |
| Sodium lauryl sulfate | 2.8 |
| Oleic acid methyl taurine-Na | 0.7 |
| Magnesium peroxide, 25% | 4.0 |
| L-malic acid salt (calculated as free acid) | 2.0 |
| Calcium carbonate, praec. | 4.0 |
| Aroma oils | 1.8 |
| Sweetening agent | 0.2 |
| | 100.0 |

EXAMPLE 10

| | G. |
|---|---|
| Ethyl alcohol, 96.4% | 20.0 |
| Aroma oils | 1.25 |
| Colloidal silica (4–20 millimicrons, commerical grade) | 3.0 |
| Colloidal silica (35–40 microns, commercial grade) | 1.0 |
| Dicalcium phosphate·2H₂O | 15.5 |
| Dicalcium phosphate, anhydrous | 4.2 |
| Disodium pyrophosphate | 3.0 |
| Sodium lauryl sulfate | 2.75 |
| Oleic acid methyl taurine-Na | 0.9 |
| Glycerol, 86% | 20.0 |
| Anhydrous glycerol or 1,2-propylene glycol | 20.0 |
| Sweetening agent | 0.15 |
| Magnesium peroxide, 25% | 4.0 |
| L-malic acid salt (calculated as free acid) | 1.0 |
| Calcium carbonate, praec. | 2.25 |
| Titanium dioxide | 1.0 |
| | 100.00 |

What is claimed is:

1. A storage-stable tooth paste having a weakly acid pH that froths in use, comprising:

(a) a colloidal silica thickener in amounts sufficient to form a paste;

(b) water in an amount of less than 10 weight percent;

(c) an alcohol selected from the group consisting of ethanol and propanol in an amount up to 50 weight percent and sufficient to stabilize the paste against gas evolution;

(d) up to 5 weight percent of a gas producing agent selected from the group consisting of sparingly soluble peroxides, carbamide peroxide and sodium perborate that liberates a gas in a weakly acid aqueous solution; and (e) in the range of 2.5 to 10 weight percent of an acid salt selected from the group consisting of the phosphates and the salts of edible polybasic organic acids;

all of the compounds used in said paste being physiologically acceptable, and when 1 part of said paste is mixed with 10 parts of water, foaming occurs and within a few minutes the mixture is weakly alkaline.

2. The paste of claim 1 wherein said composition also contains in addition to said alcohol a compound selected from the group consisting of glycerol and propylene glycol, a carbonate in addition to said gas producing agent, an abrasive, and a flavoring agent.

3. The paste of claim 1 wherein said colloidal silica is a mixture of two size ranges of particles, one having a size in the range of 4 to 20 millimicrons and the other a size in the range of 35 to 40 microns.

4. The paste of claim 1 wherein said organic acid is selected from the malic, citric, tartic and lactic acids, and said acid salt is an alkaline earth metal salt.

References Cited

UNITED STATES PATENTS

| 1,691,504 | 11/1928 | Vogt. |
| 2,069,157 | 1/1937 | Sahyun. |
| 2,089,531 | 8/1937 | Bergve. |

RICHARD L. HUFF, Primary Examiner

U.S. Cl. X.R.

424—57

UNITED STATES PATENT OFFICE
CERTIFICATE OF CORRECTION

Patent No. 3,577,521          Dated May 4, 1971

Inventor(s) Karlheinz Scheller, et al.

It is certified that error appears in the above-identified patent and that said Letters Patent are hereby corrected as shown below:

Col. 8, line 54 change "tartic" to --tartaric--.

Signed and sealed this 4th day of July 1972.

(SEAL)
Attest:

EDWARD M.FLETCHER,JR.          ROBERT GOTTSCHALK
Attesting Officer          Commissioner of Patents